INVENTORS.
STEVEN I. MIKO
HARRY R. McCUE
BY
ATTORNEY.

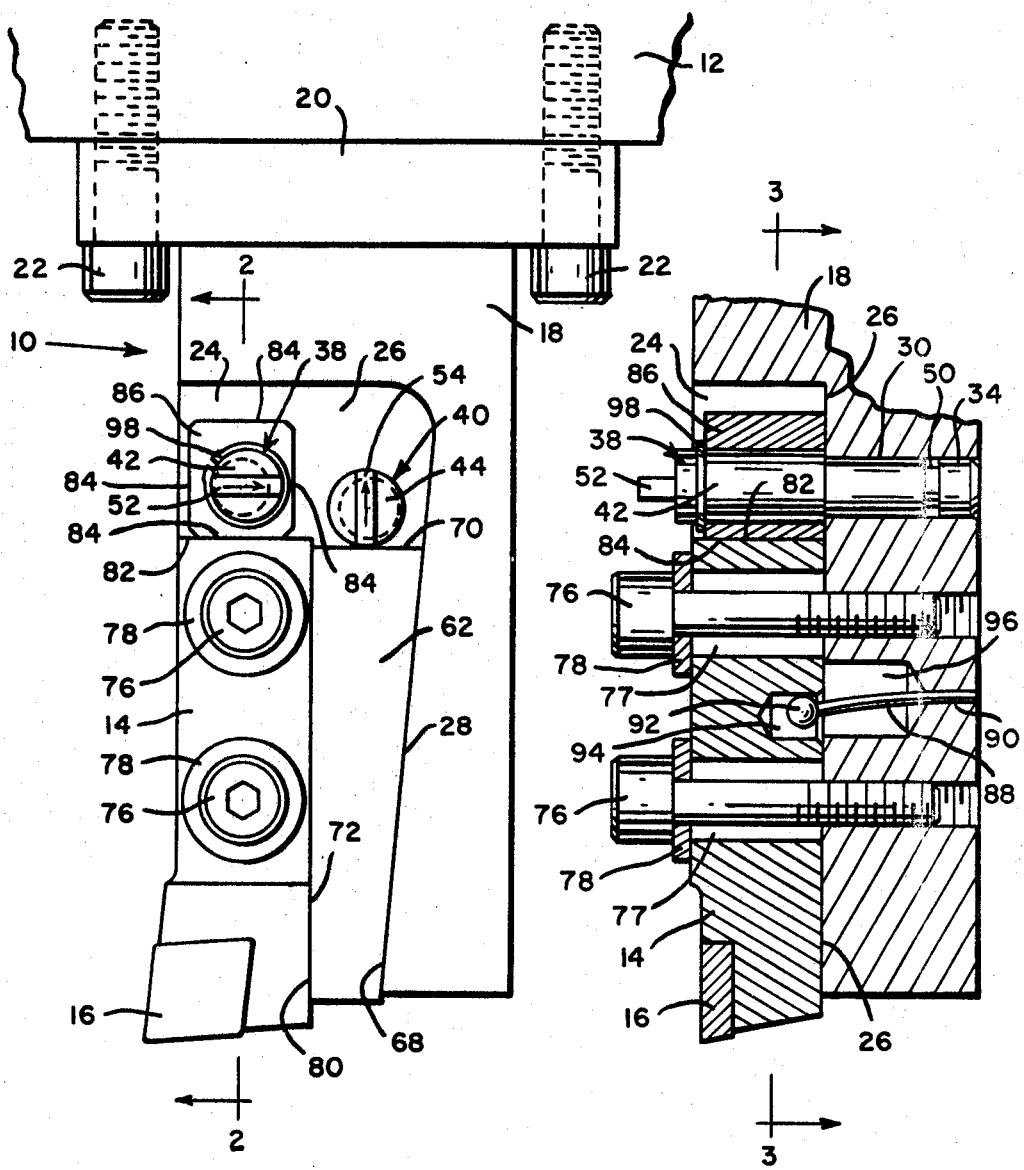

United States Patent Office 3,498,164
Patented Mar. 3, 1970

3,498,164
ADJUSTABLE TOOL SUPPORT
Steven I. Miko, Bridgeport, Conn., and Harry R. McCue, San Diego, Calif., assignors to The Bullard Company, Bridgeport, Conn., a corporation of Connecticut
Filed Mar. 14, 1968, Ser. No. 713,197
Int. Cl. B23b 29/10, 29/00
U.S. Cl. 82—37                                  6 Claims

ABSTRACT OF THE DISCLOSURE

A tool support for a metal cutting tool in which a wedge is movably mounted on the support so that a guide surface of the wedge is maintained in parallel alignment with the longitudinal axis of the support and has translatory motion only along the transverse axis of the support as the wedge is moved. The guide surface is held in contact with a reference surface or the tool to maintain the alignment of the tool relative to the support while the position of the tool is adjustably changed in directions precisely parallel to either the longitudinal or transverse axes of the support. Two rotatable eccentrics mounted on the support are used to adjust the tool position, one eccentric acting on the wedge to move the wedge and translate the guide surface relative to the support, thereby rectilinearly moving the tool in a direction parallel with the transverse axis of the support, and the other eccentric acting on the tool to rectilinearly move the tool relative to the stationary wedge in a direction parallel with the longitudinal axis of the support.

---

The present invention relates to metal cutting tool supporting apparauts for machine tools and has particular reference to an adjustable tool support having a capability for precise adjustment of the position of a cutting tool along each of two perpendicularly intersecting axes, with adjustments along either axis having absolutely no effect on the position of the cutting tool relative to the other axis.

In utilizing automated machine tools for performing repeated precision machining operations, it is generally necessary to precisely locate the cutting tool tip relative to known reference axes of the machine tool so that the machine in moving the tool through a programmed path will accurately produce the desired dimensions on a workpiece. This is a continuing process which takes place not only upon the initial setting up of a machine for a production run but also periodically during the course of a run to compensate for tool wear. To minimize the costly non-productive time required for making the necessary tool adjustments, the tool supporting apparatus generally employed has provision for both longitudinal and transverse adjustment of the cutting tool relative to the tool support base member.

However, the adjustable tool supporting apparatus having multi-directional adjustment features heretofore available has not been entirely satisfactory, particularly where extremely precise dimensional tolerances must be maintained. Such apparatus has generally been constructed with a member which has a cutting tool secured thereto being mounted to pivot about a pivot member extending from a base secured to the machine tool so that adjustment of the cutting tool in at least one direction is effected by means of a pivoting action. Consequently, the adjustment of the tool in this direction results in a curvilinear movement of the cutting tool, and the position of the tool relative to other axes of adjustment of the tool holder is not absolutely maintained. As a result, a series of corrective adjustments along the respective adjustment axes is often required to properly position the cutting tool tip relative to the machine tool reference axes. Such a procedure obviously increases the difficulty and time required for making the initial setting up of, and the periodic corrections to, the tool position along each drection of adjustment, resulting in excessive non-operating time of the machine tool and adding to the overall production costs of the parts being fabricated.

Accordingly, an object of the present invention is to provide an adjustable metal cutting tool support for use on a machine tool which eliminates the deficiencies of known tool supporting devices. Other objects include the provision of such a tool support for holding a cutting tool in which the position of the cutting tool is rectilinearly adjustable in two directions relative to the support; in which the location of the cutting tool can be precisely adjusted longitudinally of the support without affecting its transverse position relative thereto and also precisely adjusted transversely of the support without affecting its longitudinal position relative thereto; in which backlash effects in the tool adjusting mechanism are minimized; in which the range of adjustment of the cutting tool can be extended; in which both longitudinal and transverse adjustments of the cutting tool can be readily effected with a minimum of non-productive delay in the use of the machine tool with which the tool supporting apparatus is being employed; and which is simple in construction, reliable in operation, and relatively inexpensve to manufacture.

The aforementioned objects are accomplished in the present invention by providing a tool supporting apparatus with a movable wedge member having a flat guide surface which is always in parallel alignment with one adjustment axis of the tool supporting apparatus, and maintaining an adjacent flat surface of a cutting tool holder in constant full contact with the guide surface of the wedge member. Two rotatable eccentrics mounted on the tool supporting apparatus respectively move the tool holder relative to the stationary wedge member for rectilinear adjustment of the tool holder along the axis parallel to the guide surface, and move the wedge relative to the tool supporting apparatus in a manner to impart pure translatory motion to the guide surface for rectilinear adjustment of the tool holder along an axis perpendicular to the guide surface.

Numerous other objects and advantages of the invention will become apparent as it is better understood from the following description which, taken in connection with the accompanying drawings, discloses a preferred embodiment thereof.

In the drawings:

FIG. 1 is a front elevational view of a tool supporting apparatus embodying features of the present invention;

FIG. 2 is a sectional view taken substantially along the line 2—2 of FIG. 1;

Figures 3, 4:
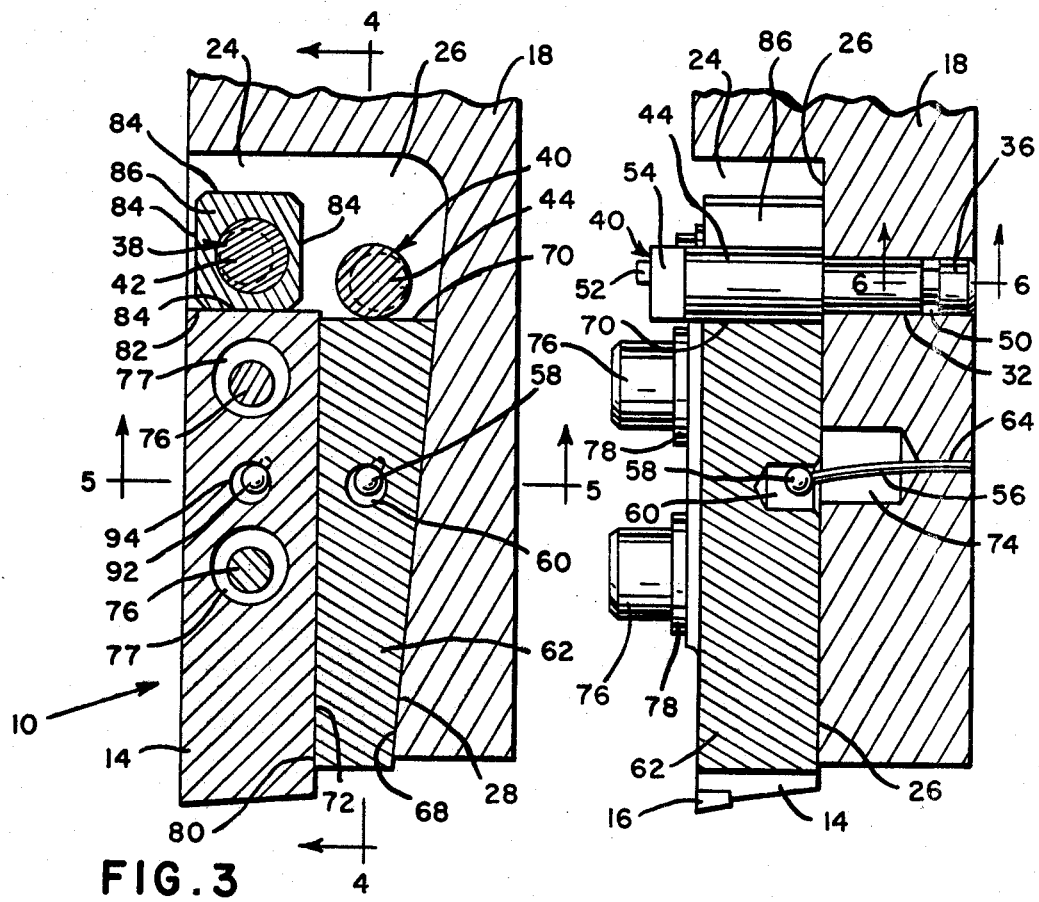
FIG. 3 is a sectional view taken substantially along the line 3—3 of FIG. 2.
Figures 5, 6:
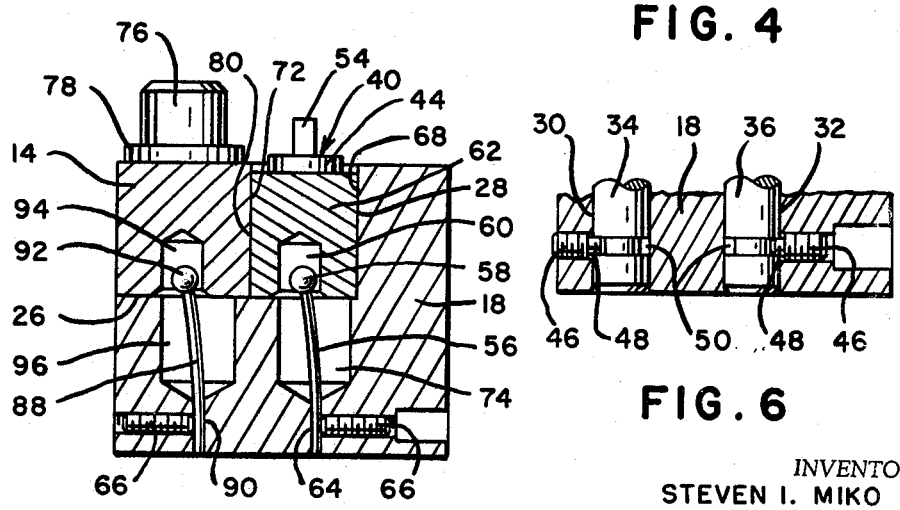

FIGS. 4 and 5 are sectional views taken substantially along the lines 4—4 and 5—5, respectively, of FIG. 3; and FIG. 6 is a partial sectional view taken substantially along the line 4—4 of FIG. 4.

As a preferred or exemplary embodiment of the instant invention, FIG. 1 shows a tool support generally designated 10 mounted on a slide 12 of a machine tool. The slide 12 may be movable along intersecting vertical and horizontal axes whereby the tool support 10 may be moved universally in a vertical plane to transport a cutting tool 14 along a programmed path, so that a cutting tip 16 fixedly mounted on the tool performs predetermined machining operations on a workpiece (not shown).

The tool support 10 has a base plate 18 depending from an integral flange 20 which is secured to the slide 12 by screws 22. A recessed portion 24 in the base plate 18 has a flat bottom surface 26 disposed substantially parallel to the plane of movement of the slide 12. A flat side surface 28 extending outwardly at right angles from the bottom surface 26 is angularly inwardly and downwardly inclined to the longitudinal or vertical axis of the tool support 10 as viewed in FIG. 1.

The base plate 18 has bores 30 and 32 extending through the recessed portion thereof which respectively journal shafts 34 and 36 of rotatable members 38 and 40 (FIGS. 2 and 4). Integrally connected to the shafts 34 and 36 are cylindrical portions 42 and 44, respectively, which have a larger diameter than, and are eccentrically positioned relative to the axis of rotation of, their respective shafts. Retaining screws 46 disposed in threaded holes in the base plate 18 have cylindrical end portions 48 which extend into closely fitting circumferential grooves 50 in the shafts 34 and 36 to prevent axial displacement of the rotatable members 38 and 40 while permitting rotatable movement thereof relative to the base plate 18 (FIG. 6). The positions of the screws 46 are preferably adjusted to cause the end portions 48 to engage the bottom surface of the grooves 50 to produce a slight frictional force resisting rotation of the rotatable members 38 and 40. Flattened head portions 52 and 54 integral with and extending outwardly from the cylindrical eccentric portions 42 and 44, respectively, are adapted to be engaged by a suitable wrench to adjustably displace the rotatable members 38 and 40 for purposes which will be more fully described hereinafter.

A cantilever spring 56 mounted in the base plate 18 has a rounded head 58 extending into a bore 60 in a wedge member 62 which is positioned in the recessed portion 24 of the base plate. The spring 56 has an end portion disposed in a closely fitting bore 64 in the base plate 18 and secured thereto by a lock screw 66 (FIG. 5). The bore 64 is positioned upwardly and to the right of the bore 60 as viewed in FIG. 3 so that the cantilever spring is deflected downwardly and to the left and accordingly urges the wedge 62 upwardly and to the right, thereby maintaining a surface 68 of the wedge in sliding contact with the side surface 28 of the recessed portion 24, and another surface 70 of the wedge in contact with the eccentric portion 44 of the rotatable member 40. As thus positioned, a guide surface 72 of the wedge is disposed in parallel alignment with the longitudinal axis of the tool support 10. As the rotatable member 40 is adjustably moved, the wedge is moved approximately longitudinally, with the surface 68 slidably moving along the surface 28 of the recessed portion 24. However, during such movements of the wedge 62, the guide surface 72 has a purely translatory motion and is maintained at all times in parallel alignment with the longitudinal axis of the tool support 10. A counterbore 74 in the base plate 18 provides clearance sufficient to permit the necessary deflections of the cantilever spring 56.

The cutting tool 14 is adjustably secured to the base plate 18 by screws 76 which extend through holes 77 in the cutting tool into threaded holes in the base plate 18. The holes 77 have a larger diameter than the shanks of the screws 76 in order to permit the cutting tool to be adjustably moved relative to the base plate 18. Washers 78 are positioned beneath the heads of the screws 76 to provide a more rigid connection between the cutting tool 14 and base plate 18 when the screws are tightened. The cutting tool is provided with flat reference surfaces 80 and 82 which are respectively maintained in contact with the guide surface 72 and a surface 84 of an adjusting block which journals the eccentric portion 42 of the rotatable member 38.

A cantilever spring 88 similar in construction and function to the cantilever spring 56 has an end portion disposed in a closely fitting bore 90 in the base plate 18 and secured thereto by a lock screw 66, and a rounded head 92 extending into a bore 94 in the cutting tool 14 (FIG. 2). The bore 90 is positioned upwardly and to the right of the bore 94 as viewed in FIG. 3 so that the spring 88 is deflected downwardly and to the left and accordingly urges the cutting tool upwardly and to the right, thereby maintaining the surfaces 80 and 82 in contact with the surfaces 72 and 84, respectively, when the screws 76 are loosened to permit a positional adjustment of the cutting tip 16. A counterbore 96 in the base plate 18 provides clearance for the necessary deflections of the cantilever spring 88.

To make either a transverse or longitudinal adjustment of the cutting tip 16, the screws 76 are loosened sufficiently to permit movement of the cutting tool 14 relative to the base plate 18, preferably without loosening the screws an amount which would entirely eliminate the frictional forces between the cutting tool and base plate surface 26. Either rotatable member 38 or 40 may then be rotatably adjusted a predetermined amount to produce the desired longitudinal or transverse change in position of the cutting tip 16. In order to achieve very precise adjustments of the cutting tip 16, a special calibrated wrench adapted to engage the head portions 52 and 54 of the rotatable members may be employed, one such wrench which can be advantageously used for this purpose being that disclosed in the copending application of Harry R. McCue entitled "Self-Indicating Adjusting Tool."

It will be apparent that with the tool supporting structure disclosed, precise transverse adjustment of the cutting tip 16 position can be effected without altering or affecting its longitudinal position relative to the tool support 10, and also precise longitudinal adjustment of the cutting tip 16 position may be effected without altering or affecting its transverse position relative to the tool support. These advantageous results, which facilitate and reduce the time and expense required for making initial tool setups as well as periodic adjustments necessitated by tool wear, etc., are achieved with a tool support structure which combines both simplicity of construction and reliability of operation.

To provide an extended range of adjustment of the cutting tool 14, the adjusting block 86 may be provided with a number of surfaces 84 which are spaced varying amounts from the center of the cylindrical eccentric portion 42. In the preferred embodiment of the invention, the eccentric portion 42 of the rotatable member 38 is displaced .015″ from the center of rotation of the shaft 34, thereby providing a total adjustable range by manipulation of the rotatable member 38 of .030″. The dimensional spacings of the respective surfaces 84 from the center of the eccentric portion 42 vary by increments of .015″, thereby providing an extended range of longitudinal adjustment of the cutting tool depending upon which of the surfaces 84 of the block 86 is positioned adjacent the surface 82 of the cutting tool. A conventional snap ring 98 may be provided to retain the block 86 in position upon the eccentric portion 42.

While in the preferred embodiment shown and described an adjusting block 86 is provided only for extending the range of longitudinal adjustment of the cutting tool, it will be apparent that a similar block may be provided for the eccentric portion 44 of the rotatable member 40 to extend also the range of transverse adjustment of the cutting tool.

It is thought that the invention and many of its attendant advantages will be understood from the foregoing description, and it will be apparent that various changes may be made in the form, construction, and arrangement of the parts without departing from the spirit and scope of the invention or sacrificing all of its material advantages, the form hereinbefore described being merely a preferred embodiment thereof.

What is claimed is:

1. A metal cutting tool supporting apparatus which is rectilinearly adjustable along two intersecting axes, comprising a base adapted to be secured to a machine tool, a tool holder having first and second right angularly disposed flat reference surfaces adjustably attached to said base and having fixedly mounted thereon a metal cutting tip, first adjusting means mounted on said base including a guide surface slidingly engaging the first reference surface of said tool holder for transversely moving said tool holder relative to said base without affecting the longitudinal alignment thereof relative to said base, second adjusting means mounted on said base and engaging the second reference surface of said tool holder for longitudinally moving said tool holder relative to said guide surface and said base without affecting the transverse positioning thereof relative to said guide surface, and spring means for continuously urging said first and second reference surfaces of said tool holder into engagement with said first and second adjustment means.

2. The tool supporting apparatus set forth in claim 1 wherein said first adjusting means includes a movable member having a longitudinally aligned guide surface in sliding engagement with said first reference surface of said tool holder.

3. The tool supporting apparatus set forth in claim 2 wherein said first adjusting means comprises a wedge member having said guide surface formed thereon and an opposed surface disposed at an angle to said guide surface in sliding engagement with an adjacent surface of said base, first rotatable means mounted on said base having a first eccentric portion in engagement with said wedge for moving said wedge while maintaining the longitudinal alignment of said guide surface as said eccentric portion is rotated, and second spring means for continuously urging said wedge member into engagement with both said eccentric portion and said base surface.

4. The tool supporting apparatus set forth in claim 2 wherein said second adjusting means comprises a second rotatable means mounted on said base having a second eccentric portion adapted to longitudinally move said tool holder relative to said base while slidingly moving said first reference surface along sad guide surface as said second eccentric portion is rotated.

5. The tool supporting apparatus as set forth in claim 4 wherein said second adjusting means additionally includes a block having a bore journaling said second eccentric portion, said block having a plurality of flat surfaces spaced different predetermined distances from the center of said bore, each of said block surfaces being adapted to be selectively positioned in engagement with the second reference surface of said tool holder to provide an extended range of longitudinal adjustment of said tool holder relative to said base.

6. The tool supporting apparatus set forth in claim 5 wherein the spacings of said flat surfaces of said block from the center of said bore vary by uniform increments substantially equal to the spacing between the center of said eccentric portion and the center of rotation of said second rotatable means.

References Cited
UNITED STATES PATENTS

| | | | |
|---|---|---|---|
| 3,236,125 | 2/1966 | Lundgren | 77—58 |
| 3,408,885 | 11/1968 | Mendenhall | 82—36 |

LEONIDAS VLACHOS, Primary Examiner

U.S. Cl. X.R.

29—96; 77—58